United States Patent [19]

Fukayama et al.

[11] Patent Number: 4,477,606

[45] Date of Patent: Oct. 16, 1984

[54] WATER RESISTANT ROOM TEMPERATURE VULCANIZABLE POLYORGANOSILOXANE COMPOSITIONS AND METHOD FOR PREPARING SAME

[75] Inventors: Miyoji Fukayama; Noriyuki Suganuma, both of Ichihara; Toshio Saruyama, Narashino, all of Japan

[73] Assignee: Toray Silicone Co., Ltd., Tokyo, Japan

[21] Appl. No.: 542,859

[22] Filed: Oct. 17, 1983

[30] Foreign Application Priority Data

Oct. 19, 1982 [JP] Japan .................. 57-183069

[51] Int. Cl.³ ........................................... C08K 3/26
[52] U.S. Cl. .................... 523/200; 523/212; 523/213; 524/425; 524/788
[58] Field of Search ............... 523/200, 212, 213; 524/425, 788

[56] References Cited

U.S. PATENT DOCUMENTS

| | | | |
|---|---|---|---|
| 4,247,445 | 1/1981 | Smith et al. | 524/425 |
| 4,374,178 | 2/1983 | Kulkarni et al. | 523/212 |
| 4,387,177 | 6/1983 | Mine et al. | 524/425 |
| 4,447,576 | 5/1984 | Fukayama et al. | 524/425 |

*Primary Examiner*—Lewis T. Jacobs
*Attorney, Agent, or Firm*—Robert Spector

[57] ABSTRACT

The water resistance exhibited during the curing of certain moisture curable RTV polyorganosiloxane compositions containing calcium carbonate fillers is significantly increased by treating the calcium carbonate with a hydrophobicizing agent selected from cationic surfactants, nonionic surfactants having HLB values of 10 or less, and organosilanes.

30 Claims, No Drawings

WATER RESISTANT ROOM TEMPERATURE VULCANIZABLE POLYORGANOSILOXANE COMPOSITIONS AND METHOD FOR PREPARING SAME

BACKGROUND OF THE INVENTION

1. Field of the Invention

This invention relates to room temperature-curable polyorganosiloxane compositions. More particularly, this invention relates to such room temperature-curable polyorganosiloxane compositions that exhibit improved water resistance during the initial stages of curing relative to prior art compositions.

2. Description of the Prior Art

The use of organosilicon compounds containing two amide groups in combination with organosilicon compounds containing 3 or more amide or aminoxy groups in room temperature vulcanizable compositions containing a hydroxyl-terminated polyorganosiloxane has been disclosed in the prior art. By varying the ratio of these difunctional and polyfunctional curing agents, it is possible to obtain a range of properties in the cured product ranging from low modulus and high elongation to high moldulus and low elongation. Low modulus-high elongation materials are widely used as construction sealants due to the superior resistance of these materials to weather and fatigue.

Room temperature vulcanizable (RTV) compositions typically contain fillers such as silica and calcium carbonate to improve the physical properties or to impart certain characteristics, such as paintability, to the cured products. Paintable RTV compositions containing hydroxyl endblocked polydiorganosiloxanes, acyloxysilanes, tin carboxylate catalysts and a finely divided, accicular form of calcium carbonate are disclosed in U.S. Pat. No. 3,957,714, which issued to Clark and Johnson on May 18, 1976, and in U.S. Pat. Nos. 4,247,445 and 4,293,616, which issued to Smith, et al. on Jan. 27 and Oct. 6, 1981, respectively.

None of the aforementioned references concerning the use of calcium carbonate in RTV polyorganosiloxane compositions disclose the susceptability of incompletely cured RTV polyorganosiloxane compositions containing calcium carbonate as a filler to undergo cracking, flow out, inhibition of curing and/or loss of adhesion to an underlying substrate in the presence of water.

One objective of this invention is to provide moisture curable calcium carbonate filled RTV polyorganosiloxane compositions which are more water resistant during curing than prior art compositions.

A second objective of this invention is to provide a method for increasing the water resistance of incompletely cured RTV polyorganosiloxane compositions containing calcium carbonate as a filler without adversely affecting other properties of the cured compositions, such as adhesion.

SUMMARY OF THE INVENTION

The objectives of this invention are achieved by treating a calcium carbonate filler for moisture curable RTV polyorganosiloxane compositions with a cationic or nonionic surfactant or with an organosilicon compound to render the particles hydrophobic. The treatment can be carried out prior to or during addition of the calcium carbonate to the curable polyorganosiloxane composition.

DETAILED DESCRIPTION OF THE INVENTION

This invention provides a room temperature vulcanizable calcium carbonate-filled polyorganosiloxane composition which is stable in the absence of moisture, curable in the presence of moisture, and exhibits water resistance and adhesion during curing, said composition comprising (A) 100 parts by weight of an hydroxyl endblocked organopolysiloxane having a viscosity at 25° C. of at least 0.02 Pa·s, (B) from 0.5 to 30 parts by weight of an organosilicon compound containing 2 amide groups per molecule, (C) from 0 to 15 parts by weight of an organosilicon compound containing at least 3 amide, aminoxy or amino groups per molecule, and (D) from 1 to 300 parts by weight of calcium carbonate which has been treated with a hydrophobicizing agent selected from the group consisting of cationic surfactants, nonionic surfactants exhibiting a maximum HLB value of 10, and organosilanes containing at least one silicon-bonded hydrocarbyl or substituted hydrocarbyl radical where the substituent on the substituted hydrocarbyl radical is selected from the group consisting of amino, epoxy, acryloxy, and mercapto groups.

The aforementioned polyorganosiloxane constitutes the base material of the present compositions. This polyorganosiloxane is preferably an $\alpha,\gamma$-dihydroxypolydiorganosiloxane of the general formula $HO+R_2SiO\rightarrow_nH$ wherein R represents a hydrocarbyl, halohydrocarbyl, or cyanohydrocarbyl radical, and n represents an integer having a minimum value such that the viscosity of the polydiorganosiloxane is at least 0.02 Pa·s at 25° C. While linear polyorganosiloxanes are preferred, branched polymers containing 3 or more hydroxyl groups per molecule can also be used.

The radical represented by R in the foregoing formula can be alkyl, such as methyl, ethyl, propyl and octyl; alkenyl such as vinyl and alkyl; aryl such as phenyl; alkaryl such as tolyl; haloalkyl such as chloromethyl and 3,3,3-trifluoropropyl or cyanoalkyl such as $\beta$-cyanoethyl. The two R radicals bonded to each silicon atom can be identical or different. To achieve a favorable balance between ease of synthesis of the polyorganosiloxane, the mechanical properties of the cured elastomers obtained from the present curable compositions, and the viscosity of the curable composition, it is preferable that at least 70% of the R radicals are methyl. Most preferably all of the R radicals are methyl.

As previously disclosed, the minimum value of n, which represents the average degree of polymerization of the polyorganosiloxane, is such that the viscosity of the polyorganosiloxane is at least 0.02 Pa·s at 25° C. When the viscosity of the polyorganosiloxane is below this value, the cured elastomer does not exhibit superior physical properties, such as flexibility and high elongation. Because hydroxyl groups are present at both ends of the polymer molecules, polyorganosiloxane (A) should be capable of further polymerization, irrespective of its molecular weight in the curable composition. Even gums having viscosities of 1,000 Pa·s or higher at 25° C. can be used, so long as further polymerization of the polyorganosiloxane is possible. A high viscosity polymer is usually mixed with a lower viscosity polymer or diluted with a solvent before being incorporated into the present composition. For practical purposes, including a useful production rate for the present curable compositions, it is preferable that the viscosity of polyorganosiloxane (A) be within the range of from 0.1 to 200 Pa·s at 25° C.

Organosilicon compound (B), containing 2 amide groups per molecule, is necessary to this invention. It reacts with the hydroxyl groups of polyorganosiloxane (A) to extend the polymer chain and produce a low modulus-high elongation cured composition. Moreover, in those instances when (A) contains 3 or more hydroxyl groups per molecule and organosilicon compound (C) is absent, organosilicon compound (B) can also function as a crosslinking agent. The reason for restricting (B) to amide group-containing organosilicon compounds is the superior single package storage stability and the remarkable adhesiveness for base materials obtained using these compounds.

Compounds that can be used as organosilicon compound (B) include, but are not limited to: bifunctional amidosilanes such as dimethylbis(N-methylacetamido)silane, dimethylbis(N-ethylacetamido)silane, methylvinylbis(N-ethylacetamido)silane, methylvinylbis(N-butylacetamido)-silane, methylphenylbis(N-methylacetamido)silane, and dimethylbis(N-phenylacetamido)silane; bifunctional amidosiloxanes such as

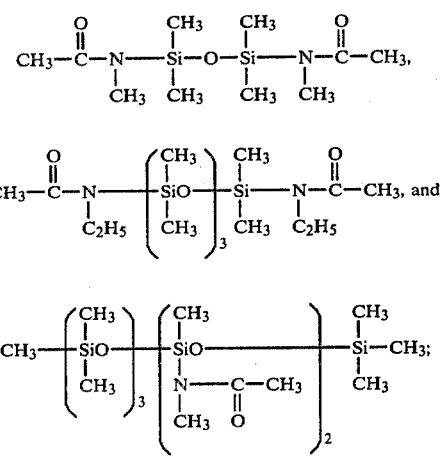

and bifunctional amidocyclosiloxanes such as

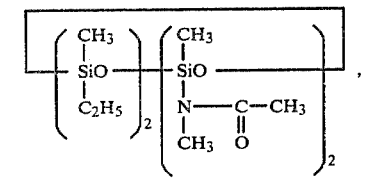

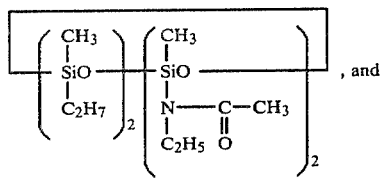, and

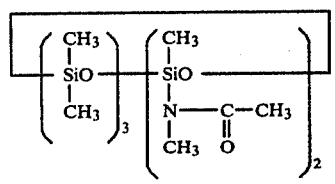

The concentration of (B) is dependent upon the required properties of the cured elastomer. In order to obtain the low modulus material which is the goal of this invention, from 0.5% to 30 parts by weight of (B) are necessary per 100 parts by weight of polyorganosiloxane (A). Below this range, the cured material will have a high modulus and the single package storage stability will be poor. Above this range, the curing rate becomes too slow, which is economically disadvantageous.

Organosilicon compound (C) must contain in each molecule at least 3 functional groups selected from among amide, aminoxy, and amino. (C) is a crosslinking agent which reacts with the hydroxyl groups of the organopolysiloxane (A) at room temperature in the presence of moisture to achieve crosslinking and curing. For this purpose, at least 3 functional groups chosen from among amide, aminoxy and amino are required in each molecule. When the molecules of (A) are branched and contain at least 3 hydroxyl groups per molecule, (C) is not required and (B) alone is adequate for curing. However, when (A) is the most commonly used embodiment, namely an α,ω-dihydroxypolydiorganosiloxane, (C) is an indispensable part of the curable composition.

The following compounds can be used when (C) is an amide group-containing organosilicon compound: amidosilanes such as methyltris(N-methylacetamido)silane and vinyltris(N-ethylacetamido)silane, tetrakis(N-butylacetamido)silane; amidosiloxanes such as

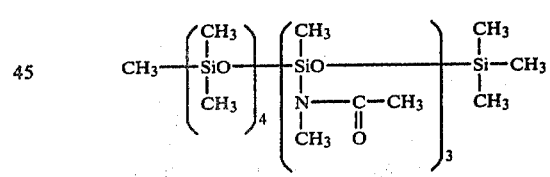

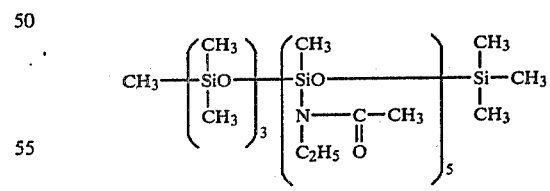

and amidocyclosiloxanes such as

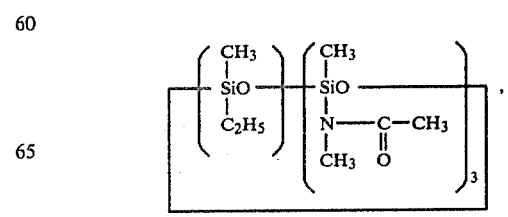

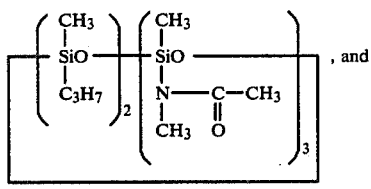, and

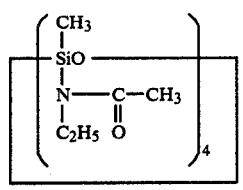

The following compounds can be used when (C) is an aminoxy group-containing organosilicon compounds: aminoxysilanes such as methyltris(diethylaminoxy)silane, phenyltris(diethylaminoxy)silane, $CH_2=CH-Si[ON(CH_2)_4]_3$ and $Si(ON(C_2H_5)_2)_4$; aminoxysilanes such as

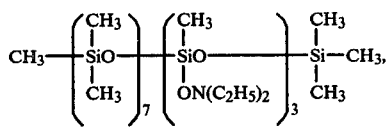

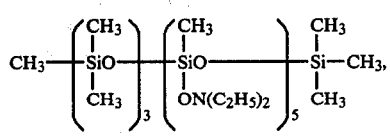

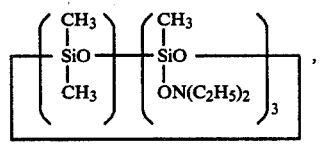

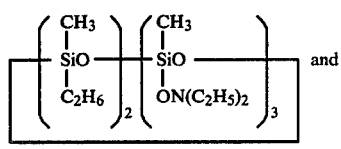 and

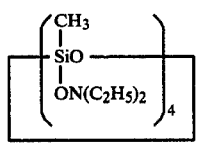

The following compounds can be used when (C) is an amino group-containing organosilicon compound:
methyltri(phenylamino)silane, ethyltri(phenylamino)silane,
methyltri(n-butylamino)silane, phenyltri(dimethylamino)-silane and methyltri(cyclohexylamino)-silane.

Alternatively, (C) can be an organosilicon compound containing in each molecule 2 or 3 types of functional groups chosen from among amide, aminoxy and amino. However, considering the difficulty of synthesis and the cost, such compounds are generally not used.

The present compositions can include as (C) one or more of the aforementioned types of amide group-containing organosilicon compounds, aminoxy group-containing organosilicon compounds and amino group-containing organosilicon compounds. In some instances 2 or 3 types of these organosilicon compounds with different functional groups can be combined and used as (C).

The total concentration of the organosilicon compounds constituting (C) should be from 0 to 15 parts by weight per 100 parts by weight of polyorganosiloxane (A). Exceeding this range will cause several problems, including a slow curing rate and no possibility of obtaining a superior cured elastomeric product, and is therefore disadvantageous both economically and practically.

The hydrophobicized calcium carbonate (D) is indispensable to achieving the objective of this invention, specifically improving the water resistance of the present compositions during the initial stage of curing. Hydrophobicization is achieved by treating the surface of calcium carbonate using at least one treatment agent selected from cationic surfactants, nonionic surfactants and organosilanes containing at least one silicon-bonded substituted or unsubstituted hydrocarbyl radical. The substitutent is an amino, epoxy, acyloxy, or mercapto group. The remaining valences on the silicon atom are preferably satisfied by alkoxy groups. Most preferably the alkoxy group is methoxy or ethoxy.

The type of calcium carbonate used is not critical. Any of the untreated commercially available types of calcium carbonate can be used. The particles are treated in accordance with this invention either prior to or during preparation of the curable compositions.

The aliphatic acids and resin acids commonly used for surface treatment of calcium carbonate are not suitable. The accompanying examples demonstrate that while these treating agents may improve the water resistance of the composition during the initial stage of curing, they adversely affect the adhesiveness of RTV polyorganosiloxane compositions for base materials.

Cationic surfactants include, among others, aliphatic amine salts, quaternary ammonium salts and alkylpyridinium salts. Among these, quaternary ammonium salts are preferred, with dodecyltrimethylammonium chloride, octadecyltrimethylammonium chloride, and dioctadecadienyldimethylammonium chloride being particularly preferred.

Nonionic surfactants include, among others, polyoxyalkylene glycols, ethers of polyoxyalkylene glycols, esters of polyoxyalkylene glycols, monoamino derivatives of polyoxyalkylene glycols and aliphatic alkanolamides. Among these, polyalkylene glycols and their monoethers or monoesters are preferred, with poly(oxyethyleneoxypropylene) glycols, polyoxypropylene glycol monoethers and poly(oxyethyleneoxypropylene) glycol monoesters being particularly preferred. Suitable nonionic surfactants exhibit a hydrophilic-lyophelic balance (HLB) of at most 10, and preferably at most 5.

Organosilanes that are useful hydrophobizing agents include, among others, aminoalkylsilanes such as γ-aminopropyltriethoxysilane; γ-(β-aminoethyl)aminopropyltrimethoxysilane and γ-aminopropyltriethoxysilane; epoxyalkylsilanes such as γ-glycidyloxypropyltrimethoxysilane and β-(3,4-epoxycyclohexyl)ethyltrimethoxysilane; acryloxyalkylsilanes such as γ-methacryloxypropylmethyldimethoxysilane and γ-acryloxypropyltrimethoxysilane; mercaptoalkylsilanes such as γ-mercaptopropylmethoxysilane and γ-mercaptopropylmethyldimethoxysilane; and hydrocarbylsilanes such as methyltrimethoxysilane, vinyltrimethoxysilane, and phenyltrimethoxysilane.

When the aforementioned organosilanes are used, it is preferably to either treat the calcium carbonate prior to adding the calcium carbonate to the curable composition or to add the organosilane while simultaneously mixing the polyorganosiloxane (A) and the untreated calcium carbonate during the production of a curable composition of this invention.

A general procedure for pretreating calcium carbonate is as follows:

Calcium carbonate is suspended in a solution of treating agent in a suitable solvent such as toluene, xylene, 1,1,1-trichloroethane, or ethanol. The treating agent is present at a concentration of from 0.1 to 5 parts by weight per 100 parts by weight of calcium carbonate. The mixture is then mixed at room temperature or with heating at reflux temperature for a period of from 30 minutes to 5 hours. The solvent is then removed by distillation in vacuo to yield a hydrophobicized calcium carbonate.

The concentration of hydrophobicized calcium carbonate is from 1 to 300 parts by weight, preferably from 5 to 150 parts by weight, per 100 parts by weight of polyorganosiloxane (A). Below 1 part by weight, the improvement in water resistance during the initial stage of curing, which is the objective of this invention, is inadequate. Above a concentration of 300 parts by weight of calcium carbonate, the composition's viscosity increases to the extent that a good quality cured elastomer cannot be obtained.

In addition to the aforementioned ingredients (A), (B), (C) and (D), finely divided inorganic fillers may be added to the present curable compositions. Examples of suitable inorganic fillers include fumed silica, calcined silica, precipitated silica, fine quartz powder, untreated calcium carbonate, titanium oxide, diatomaceous earth, aluminum hydroxide, and alumina, among others. The present compositions may also include organic solvents, mold release agents, flame retardants, plasticizers, and adhesion promoters.

The compositions of this invention can be prepared by homogeneously blending the aforementioned required and optional ingredients in a moisture-free environment. The compositions remain stable for relatively long periods in a moisture-free environment. Upon contact with atmospheric moisture, they readily cure to a silicone rubber. The resistance to rain and other forms of liquid water during the initial stages of curing is improved, as evidenced by the elimination of cracking, partial flow-out and incomplete curing. Thus, the present compositions can be applied and exposed to rain during the initial stages of curing, and are ideal construction sealants.

The following examples demonstrate preferred embodiments of this invention. "Parts" in both the examples and comparison examples refer to parts by weight, and viscosities are measured at 25° C.

The experimental results given in the examples and comparison examples were obtained using the following test methods:

Initial Water Resistance

The composition to be evaluated was extruded in beads on a glass plate and immediately showered for 5 minutes with water from an outlet located 15 cm from the composition. The rate of water flow was 5 liters per minute. In the following Table 2, "O" indicates no change in the appearance of the composition and "X" indicates flowing and/or cracking of the composition.

Adhesion Test

The composition to be evaluated was extruded in beads on a glass plate, an alumite sulfate-treated aluminum plate and a mortar plate. Each sample was then cured at room temperature for 2 weeks. The cured compositions were then peeled off the plates at 90° C. by pulling them in a direction perpendicular to the plane of the plate. In the following Table 2, "O" indicates cohesive failure of the composition and "X" indicates adhesive failure.

Test of Rubber Properties

A 2 mm-thick sheet was produced from each of the compositions. After storing the sheets at room temperature for 2 weeks, the hardness (D), tensile strength (T) and elongation (E) were measured according to JIS K6301.

EXAMPLE 1

100 parts of an α,ω-dihydroxypolydimethylsiloxane with a viscosity of 15 Pa·s were compounded with either (a) calcium carbonate which had been previously treated with an organosilicon compound or (b) a mixture of a lipophilic surfactant and untreated calcium carbonate, as shown in Table 1, and then blended to homogeneity. 10 parts dimethylbis(N-ethylacetamido)silane and 5 parts of an aminoxy group-containing organosilicon compound represented by the following structure:

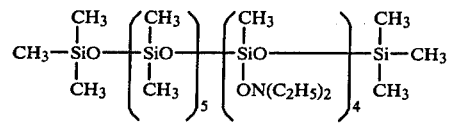

were added to this mixture and blended to homogeneity in a moisture-free environment to yield 4 compositions of this invention.

Using the methods described hereinabove, the initial water resistance, adhesion, and cured rubber properties were measured and are reported in Table 2.

For purposes of comparison, three compositions were prepared and evaluated as described in the first part of this example, the only difference being that the calcium carbonate was either untreated or treated with an aliphatic carboxylic acid or a resin acid. The results of these evaluations are also reported in Table 2.

When compared with the compositions of the present invention, the composition containing untreated calcium carbonate exhibited an inferior initial water resistance. The compositions containing aliphatic acid-treated or resin acid-treated calcium carbonate exhibited an improved initial water resistance relative to Comparison 5, however, the cured composition exhibited adhesive failure in the adhesion test.

TABLE 1

| Components | | | | | | Experiment No. | | | | |
|---|---|---|---|---|---|---|---|---|---|---|
| | | | This Invention | | | | Comparison | | | |
| | | | 1 | 2 | 3 | 4 | 5 | 6 | 7 |
| (A) | alpha,omega-dihydroxydimethylpolysiloxane (viscosity = 15 Pa · s @ 25° C.) (parts) | | 100 | 100 | 100 | 100 | 100 | 100 | 100 |
| (B) | dimethylbis(N—ethylacetamido)silane (parts) | | 10 | 10 | 10 | 10 | 10 | 10 | 10 |
| (C) | $CH_3\text{—}\left(\begin{array}{c}CH_3\\ |\\ SiO\\ |\\ CH_3\end{array}\right)_5\left(\begin{array}{cc}CH_3 & CH_3\\ | & |\\ SiO\text{—} & SiO\text{—}\\ | & |\\ CH_3 & ON(C_2H_5)_2\end{array}\right)_4\begin{array}{c}CH_3\\ |\\ Si\text{—}CH_3\\ |\\ CH_3\end{array}$ (parts) | | 5 | 5 | 5 | 5 | 5 | 5 | 5 |
| (D) | vinyltrimethoxysilane-treated light fine calcium carbonate (parts) | | 100 | — | — | — | — | — | — |
| | gamma-aminopropyltriethoxysilane-treated light calcium carbonate (parts) | | — | 100 | — | — | — | — | — |
| | aliphatic acid-treated light fine calcium carbonate (parts) | | — | — | — | — | — | 100 | — |
| | resin acid-treated light fine calcium carbonate (parts) | | — | — | — | — | — | — | 100 |
| | untreated light fine calcium carbonate (parts) | | — | — | 80 | 80 | 80 | — | — |
| | polyoxypropylene glycol monoether (parts) | | — | — | 3 | — | — | — | — |
| | octadecyltrimethylammonium chloride (parts) | | — | — | — | 1 | — | — | — |

TABLE 2

| Experiment No. | Initial Water Resistance | Adhesion | | | D | T (MPa) | E (%) |
|---|---|---|---|---|---|---|---|
| | | Glass | Aluminum | Mortar | | | |
| This Invention | | | | | | | |
| 1 | O | O | O | O | 18 | 1.03 | 1090 |
| 2 | O | O | O | O | 22 | 1.31 | 780 |
| 3 | O | O | O | O | 21 | 1.15 | 1140 |
| 4 | O | O | O | O | 24 | 1.42 | 1030 |
| Comparison | | | | | | | |
| 5 | X | O | O | O | 24 | 1.45 | 950 |
| 6 | O | X | X | X | 19 | 1.01 | 970 |
| 7 | O | X | X | X | 18 | 0.94 | 920 |

EXAMPLE 2

100 parts of an α,ω-dihydroxypolydimethylsiloxane with a viscosity of 10 Pa·s were compounded with the calcium carbonates listed in Table 3. The resulting mixture was then blended to homogeneity. To this mixture were added 15 parts dimethylbis(N-methylacetamido)silane and 1 part methyltris(N-methylacetamido)silane. The resulting mixture was blended in a moisture-free environment to homogeneity to give 5 compositions of the invention.

For comparison, the same compositions were prepared under the same conditions, except that the calcium carbonate of the invention was replaced by untreated calcium carbonate or aliphatic acid-treated calcium carbonate.

All of the compositions were evaluated as described in the foregoing specification. The ingredients present in each of the compositions and the results of the evaluation are reported in Tables 3 and 4, respectively. The results of the evaluations were similar to those obtained in Example 1.

TABLE 3

| Components | | | Experiment No. | | | | | | |
|---|---|---|---|---|---|---|---|---|---|
| | | | This Invention | | | | | Comparison | |
| | | | 8 | 9 | 10 | 11 | 12 | 13 | 14 |
| (A) | alpha,omega-dihydroxydimethylpolysiloxane (viscosity = 10 Pa · s @ 25° C.) (parts) | | 100 | 100 | 100 | 100 | 100 | 100 | 100 |
| (B) | dimethylbis(N—methylacetamido)silane (parts) | | 15 | 15 | 15 | 15 | 15 | 15 | 15 |
| (C) | $\begin{array}{c}CH_3\\ |\\ CH_3Si(NCCH_3)_3\\ \phantom{CH_3Si(}\|\\ \phantom{CH_3Si(N}O\end{array}$ (parts) | | 1 | 1 | 1 | 1 | 1 | 1 | 1 |
| (D) | gamma-aminopropyltriethoxysilane-treated light calcium carbonate (parts) | | 100 | — | — | — | — | — | — |
| | dodecyltrimethylammonium chloride-treated light fine calcium carbonate (parts) | | — | 100 | 30 | 15 | — | — | — |
| | aliphatic acid-treated light fine calcium carbonate (parts) | | — | — | — | — | — | — | 100 |
| | untreated light fine calcium carbonate (parts) | | — | — | — | 25 | 80 | 80 | — |
| | untreated heavy calcium carbonate (parts) | | — | — | 90 | 90 | — | — | — |
| | polypropylene glycol monoether (parts) | | — | — | — | — | 2 | — | — |

TABLE 4

| Experiment No. | Initial Water Resistance | Adhesion Glass | Adhesion Aluminum | Adhesion Mortar | D | T (MPa) | E (%) |
|---|---|---|---|---|---|---|---|
| This Invention | | | | | | | |
| 8 | O | O | O | O | 20 | 1.16 | 820 |
| 9 | O | O | O | O | 18 | 1.02 | 1230 |
| 10 | O | O | O | O | 16 | 0.81 | 1460 |
| 11 | O | O | O | O | 17 | 0.95 | 1550 |
| 12 | O | O | O | O | 21 | 1.13 | 1070 |
| Comparison | | | | | | | |
| 13 | X | O | O | O | 22 | 1.22 | 990 |
| 14 | O | X | X | X | 18 | 0.99 | 1200 |

EXAMPLE 3

100 parts of an α,ω-dihydroxypolydimethylsiloxane having a viscosity of 5 Pa·s were compounded with the calcium carbonates listed in Table 5 and blended to homogeneity. To the resulting mixture were added 7 parts methylvinylbis(N-methylacetamido)silane and 0.5 parts methyltris(n-butylamino)silane. After blending in a moisture-free environment to homogeneity, 4 compositions according to the present invention were obtained. A poly(oxyethylenoxypropylene) glycol was used as an in-situ treating agent.

For comparison, the same compositions were prepared under the same conditions, except the calcium carbonate of the invention was replaced by untreated calcium carbonate, aliphatic acid-treated calcium carbonate or a mixture of aliphatic acid-treated calcium carbonate and untreated calcium carbonate.

The composition of the test samples is reported in Table 5. The compositions were prepared and evaluated as described in Example 1. Table 6 reports the results, which were similar to those reported in Table 2.

TABLE 5

| | Components | This Invention 15 | 16 | 17 | 18 | Comparison 19 | 20 | 21 |
|---|---|---|---|---|---|---|---|---|
| (A) | alpha,omega-dihydroxydimethylpolysiloxane (viscosity = 5 Pa · s @ 25° C.) (parts) | 100 | 100 | 100 | 100 | 100 | 100 | 100 |
| (B) | methylvinylbis(N—methylacetamido)silane (parts) | 7 | 7 | 7 | 7 | 7 | 7 | 7 |
| (C) | methyltris(n-butylamino)silane (parts) | 0.5 | 0.5 | 0.5 | 0.5 | 0.5 | 0.5 | 0.5 |
| (D) | gamma-aminopropyltriethoxysilane-treated light fine calcium carbonate (parts) | 100 | — | — | — | — | — | — |
| | Octadecyltrimethylammonium chloride-treated light fine calcium carbonate (parts) | — | 100 | 70 | — | — | — | — |
| | aliphatic acid-treated light fine calcium carbonate (parts) | — | — | — | — | — | 70 | 100 |
| | untreated light fine calcium carbonate (parts) | — | — | 30 | 80 | 80 | 30 | — |
| | poly(oxyethyleneoxypropylene) glycol monoether (HLB = 3) (parts) | — | — | — | 3 | — | — | — |

TABLE 6

| Experiment No. | Initial Water Resistance | Adhesion Glass | Adhesion Aluminum | Adhesion Mortar | D | T (MPa) | E (%) |
|---|---|---|---|---|---|---|---|
| This Invention | | | | | | | |
| 15 | O | O | O | O | 19 | 1.10 | 1180 |
| 16 | O | O | O | O | 15 | 0.83 | 1440 |
| 17 | O | O | O | O | 17 | 0.92 | 1350 |
| 18 | O | O | O | O | 19 | 1.01 | 1280 |
| Comparison | | | | | | | |
| 19 | X | O | O | O | 20 | 1.15 | 1130 |
| 20 | O | X | X | X | 17 | 0.90 | 1320 |
| 21 | O | X | X | X | 15 | 0.80 | 1370 |

EXAMPLE 4

100 parts of an α,ω-dihydroxypolydimethylsiloxane having a viscosity of 7 Pa·s, 20 parts of a polydimethylsiloxane having a viscosity of 2 Pa·s and containing 3 Si-OH group per molecule, 30 parts of untreated light fine calcium carbonate and 90 parts of vinyltrimethoxysilane-treated light calcium carbonate were blended to homogeneity. To this mixture were added 20 parts methylvinylbis(N-methylacetamido)silane followed by blending in a moisture-free environment to homogeneity. Using this composition, the same initial water resistance test and adhesion test as described hereinbefore were carried out. Ratings of "O" were obtained in both tests.

EXAMPLE 5

100 parts of an α,ω-dihydroxypolymethylsiloxane having a viscosity of 15 Pa·s, 10 parts of hydroxyl endblocked polydimethylsiloxane gum having a viscosity of approximately 10,000 Pa·s and 120 parts octadecyltrimethylammonium chloride-treated light calcium carbonate were blended to homogeneity. To this mixture were added 15 parts dimethylbis(N-ethylacetamido)silane and 3 parts of an aminoxy group-containing organosilicon compound with the structure:

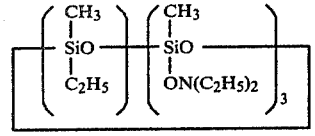

The resultant composition was blended to homogeneity, following which the same initial water resistance test and adhesion test described hereinbefore were performed. Ratings of "O" were obtained in both tests.

That which is claimed is:

1. A room temperature vulcanizable calcium carbonate-filled polyorganosiloxane composition which is stable in the absence of moisture, curable in the presence of moisture, and exhibits water resistance and adhesion during curing, said composition comprising
   (A) 100 parts by weight of a hydroxyl endblocked polyorganosiloxane having a viscosity at 25° C. of at least 0.02 Pa·s,
   (B) from 0.5 to 30 parts by weight of an organosilicon compound containing 2 amide groups per molecule,
   (C) from 0 to 15 parts by weight of an organosilicon compound containing at least 3 amide, aminoxy or amino groups per molecule, and
   (D) from 1 to 300 parts by weight of calcium carbonate which has been treated with a hydrophobicizing agent selected from the group consisting of cationic surfactants, nonionic surfactants exhibiting a maximum HLB value of 10, and organosilanes containing at least one silicon-bonded hydrocarbyl or substituted hydrocarbyl radical, where the substituent on said substituted hydrocarbyl radical is selected from the group consisting of amino, epoxy, acryloxy, and mercapto groups.

2. A composition according to claim 1 where the cationic surfactant is selected from the group consisting of aliphatic amine salts, quaternary ammonium salts and alkylpyridinium salts.

3. A composition according to claim 2 where the cationic surfactant is a quaternary ammonium salt selected from the group consisting of dodecyltrimethylammonium chloride, octadecyltrimethylammonium chloride, and dioctadecyldienyldimethylammonium chloride.

4. A composition according to claim 1 where the nonionic surfactant is selected from the group consisting of polyoxyalkylene glycols, monoethers of polyoxyalkylene glycols, monoesters of polyoxyalkylene glycols, monoamino derivatives of polyoxyalkylene glycols and aliphatic alkanolamides.

5. A composition according to claim 1 where the nonionic surfactant has a maximum HLB value of 5 and is selected from the group consisting of polyoxypropylene glycols poly(oxyethyleneoxypropylene) glycols, polyoxypropylene glycol monoethers and poly(oxyethyleneoxypropylene) glycol monoesters.

6. A composition according to claim 1 where the organosilane contains one silicon-bonded hydrocarbyl or substituted hydrocarbyl group and 3 silicon-bonded alkoxy groups.

7. A composition according to claim 6 where said hydrocarbyl radical is methyl, vinyl, or phenyl and said substituted hydrocarbyl radical is a substituted propyl radical.

8. A composition according to claim 6 where the alkoxy groups are methoxy or ethoxy.

9. A composition according to claim 8 where said alkoxy groups are ethoxy.

10. A composition according to claim 1 where the concentration of treated calcium carbonate is from 5 to 150 parts by weight.

11. A composition according to claim 1 where the hydroxyl endblocked polyorganosiloxane is a polydiorganosiloxane of the general formula HO$-$(R$_2$SiO$)_n$H where R represents a hydrocarbyl, halohydrocarbyl or cyanohydrocarbyl radical, and n represents an integer such that the viscosity of the polydiorganosiloxane is at least 0.02 Pa·s at 25° C.

12. A composition according to claim 11 where at least 70% of the radicals represented by R are methyl.

13. A composition according to claim 11 where the polydiorganosiloxane is a polydimethylsiloxane having a viscosity of from 0.1 to 200 Pa·s at 25° C.

14. A composition according to claim 1 where organosilicon compound (B) is dimethylbis(N-ethylacetamido)-silane, dimethylbis(N-methylacetamido)silane, or methylvinylbis(N-methylacetamido)silane.

15. A composition according to claim 1 where organosilicon compound (C) is selected from the group consisting of methyltris(N-methylacetamido)silane, methyltris(n-butylamino)silane,

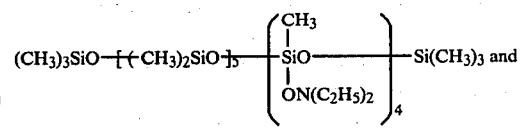

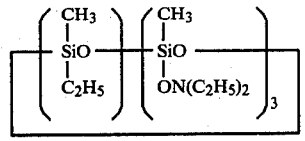

16. A method for improving the water resistance of polyorganosiloxane compositions which are curable at room temperature in the presence of moisture, said compositions having been prepared by mixing together in the absence of moisture
   (A) 100 parts by weight of a hydroxyl endblocked polyorganosiloxane having a viscosity of at least 0.02 Pa·s at 25° C.
   (B) from 0.5 to 30 parts by weight of an organosilicon compound containing two amide groups per molecule.
   (C) from 0 to 15 parts by weight of an organosilicon compound containing at least 3 amide, aminoxy or amino groups per molecule, and
   (D) from 1 to 300 parts of calcium carbonate, wherein said method comprises treating said calcium carbonate with a hydrophobicizing agent selected from the group consisting of cationic surfactants, nonionic surfactants exhibiting a maximum HLB value of 10, and organosilanes containing at least one silicon-bonded hydrocarbyl or substituted hydrocarbyl radical, wherein the substituent on said hydrocarbyl radical is selected from the group consisting of amino, epoxy, acryloxy and mercapto.

17. A method according to claim 16 where the cationic surfactant is selected from the group consisting of aliphatic amine salts, quaternary ammonium salts and alkylpyridinium salts.

18. A method according to claim 17 where the cationic surfactant is a quaternary ammonium salt selected from the group consisting of dodecyltrimethylammonium chloride, octadecyltrimethylammonium chloride, and diodadecyldienyldimethylammonium chloride.

19. A method according to claim 16 where the nonionic surfactant is selected from the group consisting of polyoxyalkylene glycols, monoethers of polyoxyalkylene glycols, monoesters of polyoxyalkylene glycols, monoamino derivatives of polyoxyalkylene glycols, and aliphatic alkanolamides.

20. A method according to claim 19 where the nonionic surfactant has a maximum HLB value of 5 and is selected from the group consisting of polyoxypropylene glycols poly(oxyethyleneoxypropylene) glycols, polyoxypropylene glycol monoethers and poly(oxyethyleneoxypropylene) glycol monoesters.

21. A method according to claim 16 where the organosilane contains one silicon-bonded hydrocarbyl or substituted hydrocarbyl group and 3 silicon-bonded alkoxy groups.

22. A method according to claim 21 where said hydrocarbyl radical is methyl, vinyl, or phenyl and said substituted hydrocarbyl radical is a substituted propyl radical.

23. A method according to claim 21 where the alkoxy groups are methoxy or ethoxy.

24. A method according to claim 23 where said alkoxy groups are ethoxy.

25. A method according to claim 16 where the concentration of treated calcium carbonate is from 5 to 150 parts by weight.

26. A method according to claim 16 where the hydroxyl endblocked polyorganosiloxane is a polydiorganosiloxane of the general formula HO(-R$_2$SiO-)$_n$H where R represents a hydrocarbyl, halohydrocarbyl or cyanohydrocarbyl radical, and n represents an integer having a minimum value such that the viscosity of the polydiorganosiloxane is at least 0.2 Pa·s at 25° C.

27. A method according to claim 26 where at least 70% of the radicals represented by R are methyl.

28. A method according to claim 26 where the polydiorganosiloxane is a polydimethylsiloxane having a viscosity of from 0.1 to 200 Pa·s at 25° C.

29. A method according to claim 16 where organosilicon compound (B) is dimethylbis(N-ethylacetamido)silane, dimethylbis(N-methylacetamido)silane, or methylvinylbis(N-methylacetamido)silane.

30. A method according to claim 16 where organosilicon compound (C) is selected from the group consisting of methyltris(N-methylacetamido)silane, methyltris(n-butylamino)silane,

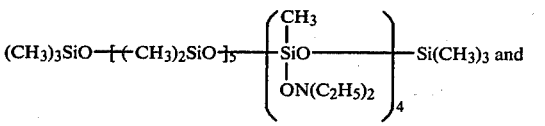 and

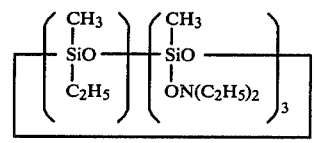.

* * * * *

UNITED STATES PATENT AND TRADEMARK OFFICE
CERTIFICATE OF CORRECTION

PATENT NO. : 4,477,606
DATED : October 16, 1984
INVENTOR(S) : M. Fukayama, N. Suganuma, T. Saruyama It is certified that error appears in the above-identified patent and that said Letters Patent is hereby corrected as shown below:

In column 2, line 40, "alkyl" should read -- allyl --.

In column 5, line 23,

"$CH_2=CH-Si[ON(CH_2)_4]_3$ and $Si(ON(C_2H_5)_2]_4;$" should read

-- $CH_2=CH-Si[ON(CH_2)_4]_3$ and $Si[ON(C_2H_5)_2]_4;$ --.

In column 14, line 63, "diodadecyldienyldimethylammonium" should read -- dioctadecyldienyldimethylammonium --.

Signed and Sealed this

Twenty-fifth Day of June 1985

[SEAL]

Attest:

DONALD J. QUIGG

*Attesting Officer*    *Acting Commissioner of Patents and Trademarks*